United States Patent [19]

Ibbott

[11] Patent Number: 4,902,391
[45] Date of Patent: Feb. 20, 1990

[54] METHOD AND DEVICE FOR IONIZING FLUID

[76] Inventor: Jack K. Ibbott, 17-7 Nishiazabu 4-chome, Minato-ku, Tokyo 106, Japan

[21] Appl. No.: 150,428

[22] PCT Filed: May 1, 1987

[86] PCT No.: PCT/JP87/00277
§ 371 Date: Dec. 30, 1987
§ 102(e) Date: Dec. 30, 1987

[87] PCT Pub. No.: WO87/06925
PCT Pub. Date: Nov. 19, 1987

[30] Foreign Application Priority Data

May 6, 1986 [JP] Japan ................... 61-103439
Aug. 5, 1986 [JP] Japan ................... 61-182732

[51] Int. Cl.⁴ .............................................. C02F 1/46
[52] U.S. Cl. ................................... 204/150; 204/248
[58] Field of Search ................... 204/150, 248, 249

[56] References Cited

U.S. PATENT DOCUMENTS 3,026,259  3/1962  Phillips ............................... 204/150
3,342,712  9/1967  O'Keefe .............................. 204/150
3,686,092  8/1972  Stehlin ............................... 204/150

FOREIGN PATENT DOCUMENTS 1288552  9/1972  United Kingdom .

Primary Examiner—T. Tufariello
Attorney, Agent, or Firm—Wenderoth, Lind & Ponack

[57] ABSTRACT

A method of ionizing a fluid uses the principle of a Voltaic cell wherein, first and second electro-conductive members formed of materials having different electrochemical potentials are spaced from each other and are immersed in fluid such as water to be ionized, the fluid serves as an electrolyte, and these electro-conductive members are electrically connected to cause electric energy to flow in the fluid, whereby the fluid is ionized. A device for carrying out this method includes first and second electro-conductive members formed of materials having different electrochemical potentials and spaced from each other to permit the fluid to flow therebetween, the members being electrically connected to each other.

11 Claims, 3 Drawing Sheets

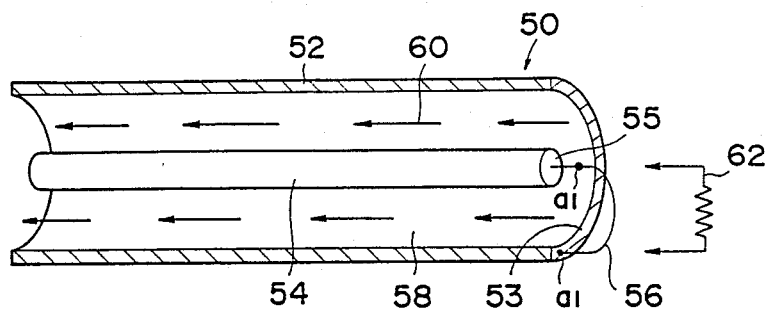
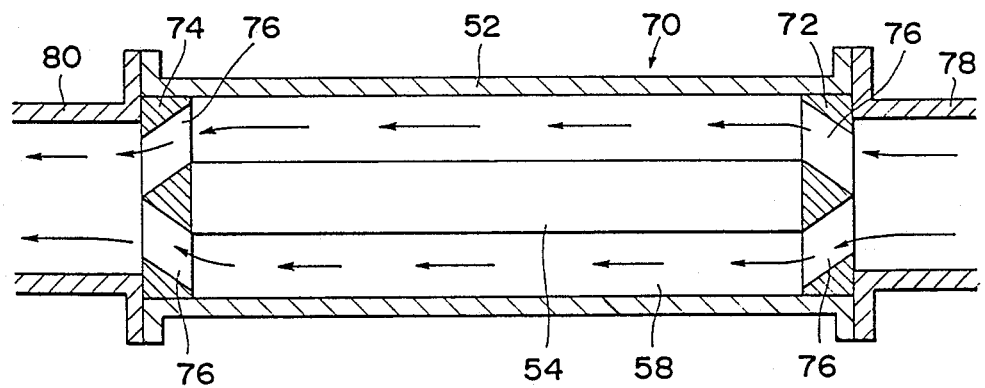
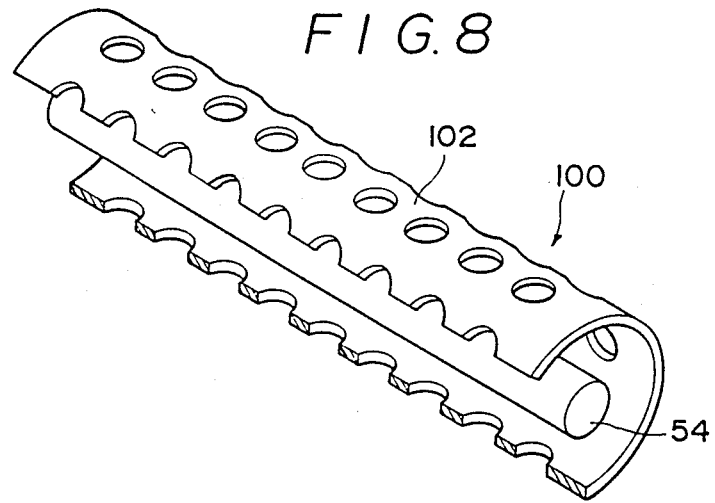

METHOD AND DEVICE FOR IONIZING FLUID

BACKGROUND OF THE INVENTION

1. Field of the Invention

The present invention relates to a method and device for ionizing fluid such as water. More particularly, the present invention relates to a method for effecting ionization by employing the electric energy flowing in such fluid, and a device therefor.

2. Description of the Related Art

Conventionally, those skilled in the art have known well that ionized fluid such as ionized water provides various effects. For example in a steel water pipe system, a scale mainly consisting of ferric oxide is deposited on the inner wall of the steel pipe, thereby reducing the inner diameter resulting in a reduced flow rate and pressure. It is well known that ionized water is used to remove the scale. When ionized water flows through the pipe, the oxide scale deposited on the inner wall is changed into a soft hydroxide (ferric hydroxide) which is removed gradually.

Also, it is well known that ionized water provides a cleaning effect. As a brief explanation of this cleaning effect, soap forms a colloidal solution in water, and is in fact an electrolyte, and becomes strongly ionized and there is a separation of the minus and plus ions. In the case of oils such as body oils and other forms of oily substances, the difficulty of washing or removing these oils is due to the strong surface tension which they exhibit, and this strong surface tension is the result of strong internal charge bonding between the molecules. When a soap solution is added to this oil, the ionized soap solution breaks the surface tension of the oil solution. The ionic charge of the soap solution is stronger than the internal charge between the oil molecules. This causes the oily substances to be easily absorbed and carried away by the water. Accordingly, an ionized solution such as water wherein the minus and plus ion charges are generated can provide a similar cleaning effect to that of soap solution on oily substances.

In order to improve agricultural growth, the addition of the ionizing compounds and materials to the soil has been well known and commonly carried out plant food and with ionizing pellets added to the soil. Ionized water can increase the ionic concentration of the soil as compared to the pellets, and it can be more easily absorbed by plants.

The method and device effecting the ionization of fluids by using the electric energy flowing in a fluid and by employing a very strong magnetic field is well known. Specifically, water flowing in a magnetic field is ionized according to the principle of electromagnetic induction, i.e. when a conductor is caused to move in a magnetic field a flow of electric energy is induced in the conductor. However, this method and device require the fluid to move in the magnetic field to effect the ionization of the fluid. The degree of ionization directly depends on the flow rate of the fluid. When a magnet is arranged on a reservoir or the like, the water of such a reservoir is not moved and its ionization is kept at a remarkably low degree. On the contrary, when a magnet is used in a water pipe to ionize the water flowing therethrough, magnetic particles such as ferric particles in the pipeline are attracted and deposited around the magnet. This deposit causes a reduction in the available internal space. Further, the magnet type device requires a high density magnetic flux, and therefore such a device is very expensive.

SUMMARY OF THE INVENTION

With the above-mentioned problems in mind, it is an object of the present invention to provide a method and device for ionizing fluid which can effect the ionization of fluids, even when not flowing, with high efficiency, and eliminate problems caused by the deposition of magnetic substances such as ferric particles, and which device can be produced at a low cost.

To accomplish the above-mentioned object, the method for ionizing fluid according to the present invention comprises causing the fluid to flow through a space between a first electro-conductive member and a second electro-conductive member, these first and second members having different electrochemical potentials, and the first member being electrically connected with the second member to transmit electric energy through the fluid, whereby the fluid is ionized.

The device for achieving the above mentioned method comprises a first electro-conductive member as a positive electrode and a second electro-conductive member as a negative electrode, these first and second members having different electrochemical potentials and being spaced apart so as to accommodate the fluid such as water therebetween, and being electrically connected.

In the method and device according to the present invention, the first and second electro-conductive members, such as electrodes, having dissimilar electrochemical potentials and the fluid, such as water, acting as an electrolyte interposed between these electro-conductive members, form a voltaic cell. When these electro-conductive members are electrically connected, a flow of electric energy is produced between these electro-conductive members and the fluid is ionized.

As mentioned above, the ionized fluid, for example ionized water, provides various effects. Therefore, the method and device according to the present invention may be applied to a water pipeline system to remove the oxide scale therefrom. Further, when the device according to the present invention is installed into the feed systems of a shower, watering pot, and the like, it can provide ionized water suitable for cleaning the human body and feeding plants.

In one of the preferred embodiments according to the present invention, the first and second electro-conductive members are plates partly immersed in the fluid.

In another embodiment of the present invention, the first electro-conductive member is tubular and the second electro-conductive member is a smaller diameter longitudinal member situated in the internal space of the first tubular member. The fluid flows through the space between the first and second members.

The electrical connection between the first electro-conductive member and the second member can not only be carried out by a mechanical means such as conductive wire with or without electric resistors but also by the fluid adjacent the space between these members. This is provided by the electro-conductivity of the fluid not subjected to ionization.

Other objects, features and advantages of the invention will be apparent from the following description of the preferred embodiments with reference to the accompanying drawings.

BRIEF DESCRIPTION OF THE DRAWINGS

FIG. 4 is a partial sectional view showing a basic structure of another embodiment of the device according to the present invention;

FIG. 5 is a sectional view showing the device of FIG. 4 applied to a pipe line;

FIG. 8 is a partially sectional perspective view showing a further embodiment of the device according to the present invention.

DETAILED DESCRIPTION OF THE EMBODIMENTS

Figure 1A:
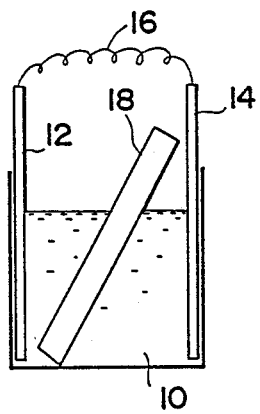
FIG. 1 is a schematic diagram illustrating a test to prove the scale removing effect provided by water ionized according to the present invention.

The inventor provided the test device shown in FIG. 1A for effecting the ionization of fluid and showing the oxide scale removing effect provided by the ionized fluid. This device comprises a beaker containing water 10, two plates 12 and 14 which are made of different materials having dissimilar electrochemical potentials, and a lead 16 electrically connecting the two plates 12 and 14 immersed in the water 10. This structure, i.e., one plate serving as a positive electrode, the other plate serving as a negative electrode, and the water 10 serving as an electrolyte, forms a voltaic cell. For example, when the plate 12 is made of carbon serves as the positive electrode and the other plate 14 is made of a metal which is higher than the carbon in view of electrochemical potential and serves as the negative electrode, an open circuit voltage having a maximum value of 0.6 V is produced depending on the metal used for the negative electrode. Such a metal electrode should be selected from materials which are non-corrosive and capable of producing a high voltage. According to the various tests, some metals satisfied these requirements, and more particularly the optimum metal is a high purity aluminium which is relatively stable under the required operation condition, non-corrosive, relatively low cost, and has a high voltage potential.

Since the lead 16 is connected between the carbon electrode 12 and the aluminium electrode 14, they form an electric circuit with the water 10 as the electrolyte, and electric energy flows through the water 10. This electric energy performs the ionization of the water 10. This test device provided an electric current of 66 μA at its initial stage when the electrodes were first connected through the lead 16. Then this current decreased to about 50 μA and this level was maintained constant. After operating for 5 weeks, the device constantly produced a current of about 50 μA and the aluminium electrode 14 appeared non-corroded. This device is able to be used for an extremely long time without requiring maintenance and replacement.

Figure 1B:
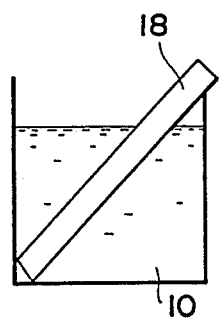
Figure 1C:
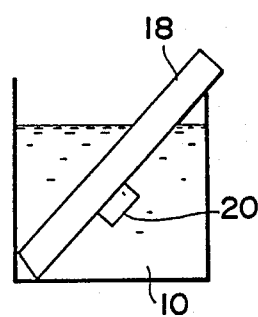

A test for proving the oxide scale removing effect provided by the above-mentioned device was done using an iron plate 18 the surface of which was covered with rust (ferric oxide). The iron plate 18 was placed in beaker A. For providing a comparative test, beaker B containing water 10 and a similar iron plate 18 with rust immersed in the water 10, and beaker C containing the water 10, a similar iron plate 18 with rust, and a magnet 20 of 2000 G were prepared as shown in FIG. 1. The three pieces of the iron plate 18 used in this test were cut from a single iron plate and selected to be as equally covered with the same amount of oxide scale as possible.

After leaving the beakers in the state as shown in FIG. 1 for one week, the beakers and the iron plates were checked and the following results were obtained.

The water 10 in the beaker B had changed to a red-brown corresponding to the color of ferric oxide, and the water surface was covered with red scum. Some ferric oxide was precipitated at the bottom of the beaker B, but the surface of the iron plate 18 was not changed.

The water 10 in the beaker C had also changed to a light red-brown similar to that of the beaker B, and some scum appeared on the water surface. There was more precipitation at the bottom than there was in beaker B. The roughness of the surface of the iron plate 18 due to the rust scale was slightly reduced.

The water 10 in the beaker A had not changed and the surface was not covered with scum. On the other hand, a large amount of light-brown precipitate of ferric hydroxide like cotton wool had precipitated at the bottom of the beaker A. Much of the rust scale had been removed from the iron plate 18 in the beaker A and in some parts it was sufficiently removed to show the black base material.

Further, when the iron plate 18 was electrically connected with the electrodes 12 and 14, more of the rust was removed as compared to the test without electrical connection. Both cases provide excellent results.

As can be understood from the above explanation, the method of the present invention is based on the principle of a voltaic cell and is essentially distinguishable from conventional cell driving systems. In the invention, a specific process is carried out in the electrolyte which is a component of the cell, whereas in conventional systems the electric energy generated by the cell is used externally of the cell for such work as driving a motor, lighting a lamp, etc.

Water in an ordinary state is not pure and contains various solutes in a wide range from a very small quantity to an easily detectable quantity. In particular ordinary tap water which flows through a long pipeline from its source to the user contains many components of the pipe. Pure water without any impurities has a relatively low ionization level and it is a very poor conductor and electrolyte. But the water containing solutes is readily ionized and a good conductor and is an excellent electrolyte.

Preferred embodiments according to the present invention will be discussed.

Figure 2:
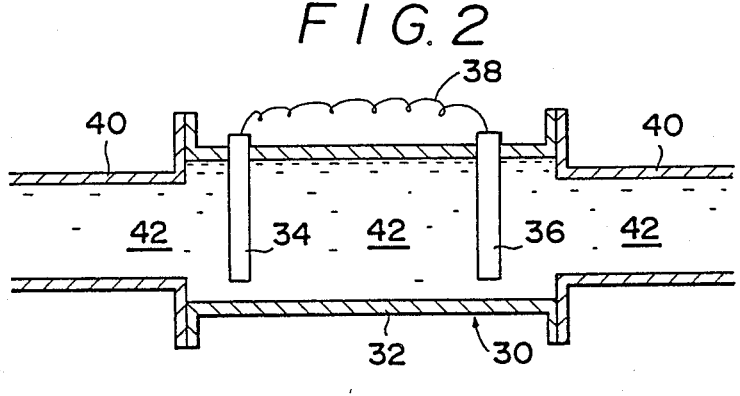
FIG. 2 is a sectional view showing one embodiment of a device according to the present invention applied to a pipe line.

FIG. 2 shows a preferred device according to the invention as applied to a water pipeline system. This ionizing device 30 comprises a tubular member 32 interposed in a metal pipeline 40 and two electrodes 34 and 36 which are fixed to the tubular member 32. The electrodes 34 and 36 are spaced apart and extend through the wall. One electrode 34 serving as the positive electrode is made of carbon and the other electrode 36 serving as the negative electrode is made of aluminium. The tubular member 32 is made of an insulating plastic material so as to electrically isolate the electrodes 34 and 36 from the metal conduit 40. The electrodes 34 and 36 are electrically connected through lead 38 so that water 42 flowing through the pipeline 40 and the tubular member 32 is highly ionized when the water 42 passes between the electrodes 34 and 36. After passing between the electrodes the water retains its ionization state as it flows through the metal pipeline and changes the ferric oxide scale deposited on the inner surface of the pipe 40 into a soft hydroxide. This hydroxide can be easily removed from the conduit by the flowing water. In such a manner, the ferric oxide scale deposited on the inner surface of the pipe located downstream from the ionizing device is gradually removed.

Figure 3:
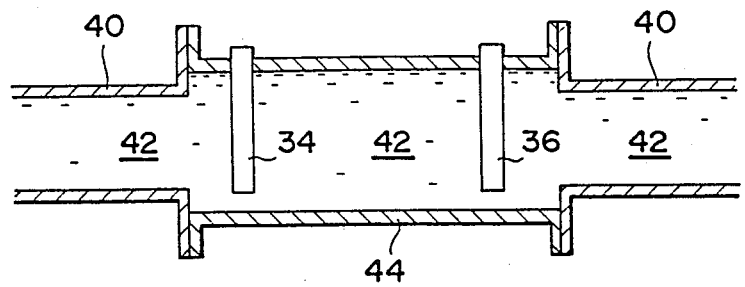
FIG. 3 is a sectional view showing another embodiment of the present invention applied to a pipe line.

FIG. 3 shows a modification of the device shown in FIG. 2, which is substantially the same as the device described above except that the tubular member 44 is made of a conductive metal material. In this case, the electrodes 34 and 36 are electrically connected through the tubular member 44 so that the lead 38 in FIG. 2 can be eliminated. Also, the metal conduit 40 is electrically connected with the electrodes 34 and 36.

FIG. 4 shows another preferred embodiment of the device for effecting ionization according to the present invention. This device 50 contains an open ended tubular member 52 made of aluminium. A rod member 54 made of carbon extends longitudinally in the tubular member 52. One end 55 of the rod member 54 is electrically connected to one end 53 of the tubular member 52 through a lead 56. Water 60 flows in the direction represented by the arrow through the annular space 58 defined between the tubular member 52 and the rod member 54 serving. The rod member 54 as the positive electrode, the aluminium tubular member 52 serving as the negative electrode, and the water 60 flowing between both electrodes and serving as the electrolyte, form a voltaic cell and an electric circuit through the lead 56 and the water 60 (electrolyte). As electric energy flows through the circuit, the water is subjected to dissociation and ionization by the electric energy. The water 60 after passing through the device 50 retains its dissociation and ionization state for a period of time.

Measurements of electric conductivity of ordinary tap water before entering the annular space 58 and water taken from the voltaic cell device 50 show a lower conductivity of the water taken from the device 50. This is similar to the charging of a secondary type battery wherein the liquid electrolyte increases in resistance to electric flow as the battery becomes charged. When the charging circuit is initially established the charging current is high because of the low electric resistance of the electrolyte. Then, as the charging progresses, the charging current gradually diminishes due to the increasing dissociation and ionization of the electrolyte providing increasing resistance to electric current flow. That is, the water taken from the device 50 exhibiting a lower conductivity proves that the water is ionized as it flows through the tubular member 52.

The degree of dissociation and ionization in the tubular member 52 can be controlled by regulating the voltage and current of the above-mentioned voltaic cell structure. To achieve this control, the lead 56 for connecting the tubular member 52 and the longitudinal member 54 is replaced with an electric resistor 62 having a selected resistance value. For example, in FIG. 4, the section between a1—a1 of the lead 56 is removed and replaced with an electric resistor 62.

In various tests made to determine acceptable resistance values for the resistor 62 it was found that a wide range of resistance values could be used. Even leaving off lead 56 and without the resistor 62 being connected, dissociation and ionization of the water was efficient. Further investigation showed that the internal resistance between the longitudinal member 54 and the aluminium tubular member 52, as the water 60 in a normal state entered the annular space 58 and before it became dissociated and ionized, was in effect equivalent to using an external electro-conductive resistance.

The water after passing through the tubular member 52 of the device 50 is in a dissociated and ionized state, which is a highly activated condition. The state of the ionized water will gradually revert back to a neutral condition over a period of a few hours unless otherwise changed by contact with substances, compounds, or other conditions which will cause neutralization of the dissociation and ionization, such as the conversion of hard ferric oxide scale in water pipeline to the soft ferric hydroxide, and other scale deposits such as calcium and magnesium converted into soft calcium and magnesium compounds.

FIG. 5 shows an example wherein the device according to the present invention is installed in a pipe line. In this drawing, the same numerals denote the same or corresponding parts of the device shown in FIG. 4. In such a device 70, an aluminium tubular member 52 is provided with insulating supporting blocks 72 and 74 at both open ends of the tubular member 52. The supporting blocks 72 and 74 hold a rod-shape member 54 at a central position and have a plurality of openings 76 around the central position. Both ends of this device 70 are connected to pipes 78 and 80 of, for example, a water pipeline system. The fluid such as water flows from the upstream pipe 78 to the annular space 58 through the openings 76 formed in the block 72 and is subjected to dissociation and ionization in the space 58, and then flows into the downstream pipe 80 through the openings 76 formed in the block 74.

Figure 6:
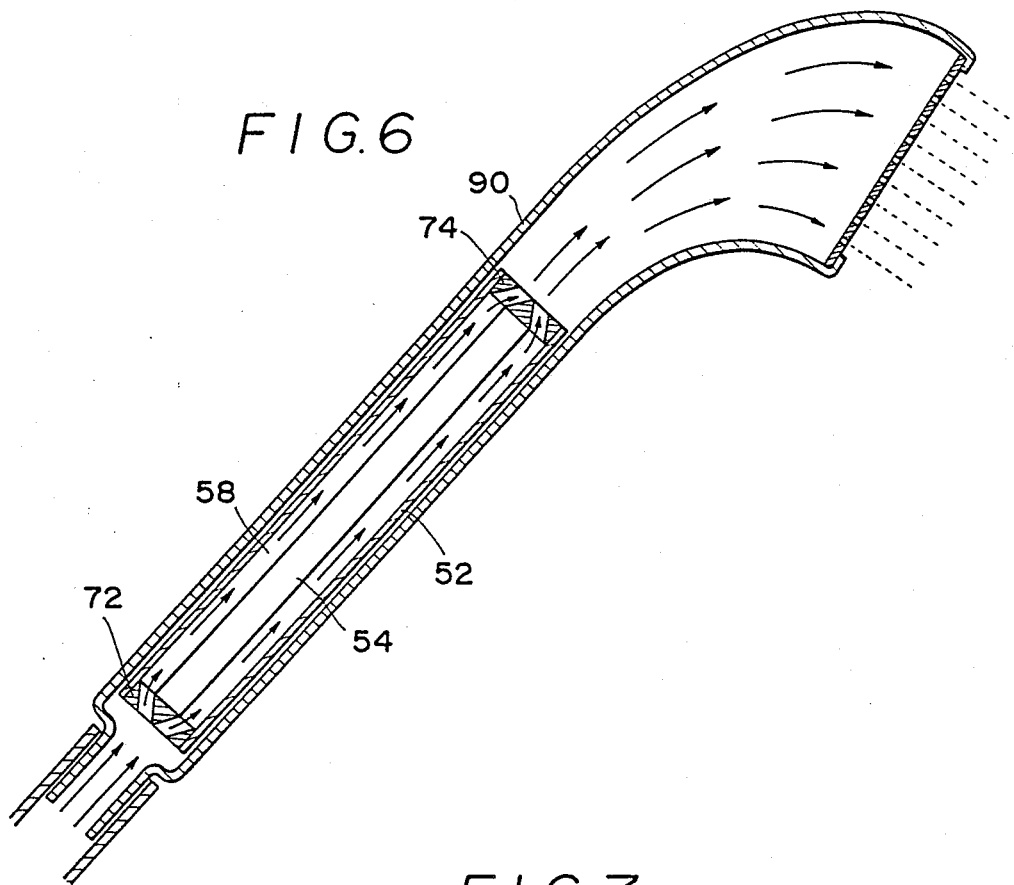
FIG. 6 is a sectional view showing the device of FIG. 4 set in a shower nozzle.

FIG. 6 shows an example wherein the device shown in FIG. 4 is set in a shower nozzle 90. As mentioned above, the ionized water has a cleaning effect on oily substances. The water exiting the nozzle 90 containing the ionizing device is ionized, and oily substances can be easily removed from the human body by this ionized water.

Figure 7:
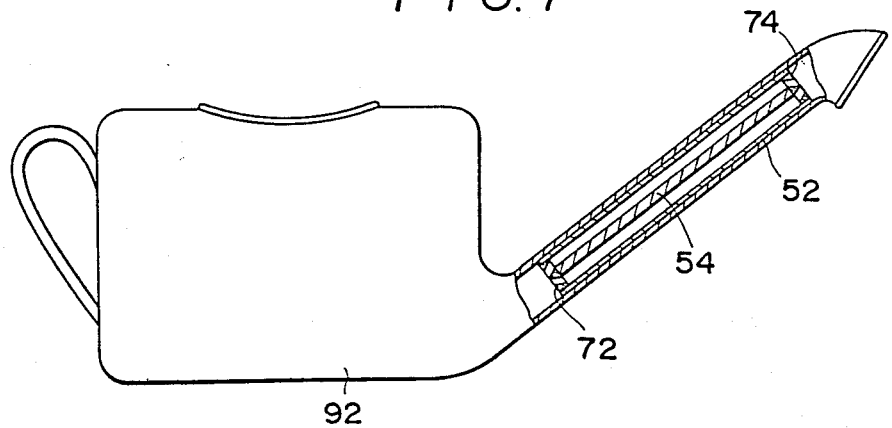
FIG. 7 is a partial sectional view showing the above device set in a watering can.

FIG. 7 shows an example wherein the device is disposed in the neck of a watering can 92. According to this application the water fed from the watering can 92 is ionized. Since ionizing compounds or materials added to soil improve plant growth, ionized water can be supplied to plants by using the watering can 92 to enhance the growing conditions of the plants.

FIG. 8 shows another embodiment of the device for effecting ionization according to the present invention. This device 100 has substantially the same structure as the device shown in FIG. 4 except for the tubular member 52 which is replaced having a tubular member 102 with many through holes extending therethrough. This ionizing device 100 is suitable for ionizing water in a bath tub or soap solution in a washing machine by simply placing it therein.

It is to be noted that although carbon and aluminium have been specified for the electrodes in the above description of the present invention, other combinations of dissimilar electroconductive materials may be used, such as carbon and zinc, copper and chrome, etc.

As is clear from the explanation above, the present invention provides a structure employing two dissimilar electroconductive materials as electrodes in a fluid such as water, thereby forming an electric system to ionize the fluid, and thus provides many advantages in comparison with conventional methods and devices for effecting ionization employing a magnet. One advantage of the present invention is providing an improved ionization efficiency even if the fluid is not moving. A further advantage of the present invention is the lower initial cost. A still further advantage is that there is no possibility of magnetic particles such as ferric particles being deposited in the device due to magnetic attraction.

I claim:

1. A method of ionizing an electroconductive fluid, said method comprising:
   providing a first electroconductive member and a second electroconductive member having different electrochemical potentials in a spaced apart relationship; and
   electroconductively connecting said first and said second members by only disposing electroconductive fluid therebetween to develop an electric potential between said members that causes the fluid to be ionized.

2. A method as claimed in claim 1,
   wherein the step of providing electroconductive members comprises providing a first electroconductive member having the shape of a plate and a second electroconductive member having the shape of a plate, and the step of electroconductively connecting said members consists of immersing at least a part of each of said members in the fluid.

3. A method as claimed in claim 1,
   wherein the step of electroconductively connecting the members consists of disposing the electroconductive fluid in both the space defined between the members and in a space adjacent thereto, the electric potential between the members that causes the fluid to be ionized being developed by the portion of the fluid disposed adjacent the space defined between the members.

4. A method as claimed in claim 1,
   wherein the step of providing the electroconductive members comprises providing a first electroconductive member that is tubular and a second electroconductive member extending substantially along the longitudinal axis of the first electroconductive member, and the step of electroconductively connecting the members consists of disposing the electroconductive fluid in an annular space defined between the first electroconductive member and the second electroconductive member.

5. A method as claimed in claim 1,
   and further comprising causing the electroconductive fluid to flow through the space defined between the electroconductive members.

6. A device for ionizing an electroconductive fluid, said device comprising:
   a positive electrode comprising a first electroconductive member;
   a negative electrode comprising a second electroconductive member spaced apart from said first electroconductive member,
   said first and said second electroconductive members having different electrochemical potentials; and
   an electroconductive connection established between said electroconductive members that develops an electric potential between said members, said electroconductive connection consisting of electroconductive fluid disposed between said electroconductive members.

7. A device as claimed in claim 6,
   wherein said first and said second electroconductive members each have the shape of a plate, and a part of each of said members is immersed in the electroconductive fluid.

8. A device as claimed in claim 6,
   wherein said first electroconductive member is tubular, said second electroconductive member extends along a longitudinal axis of the first electroconductive member and has a cross-sectional area that is smaller than the cross-sectional area of the space defined within said tubular first electroconductive member, and said fluid is disposed in the space defined between said electroconductive members.

9. A device as claimed in claim 8,
   wherein a portion of the electroconductive fluid is disposed in the space defined between the electroconductive members and a portion of the electroconductive fluid is disposed outside of the space defined between said electroconductive members, said electroconductive connection established by said portion of the electroconductive fluid that is disposed outside of the space and between said electroconductive members.

10. A device as claimed in claim 8,
    wherein said first electroconductive member has a plurality of holes extending therethrough.

11. A device as claimed in claim 6,
    wherein said positive electrode is a carbon electrode and said negative electrode is an aluminum electrode.

* * * * *